United States Patent
Shoemake et al.

(10) Patent No.: US 7,593,339 B2
(45) Date of Patent: Sep. 22, 2009

(54) RATE CONTROL FOR PACKET-BASED WIRELESS COMMUNICATION

(75) Inventors: Matthew B. Shoemake, Allen, TX (US); Sridhar Rajagopal, Allen, TX (US)

(73) Assignee: QUALCOMM Incorporated, San Diego, CA (US)

( * ) Notice: Subject to any disclaimer, the term of this patent is extended or adjusted under 35 U.S.C. 154(b) by 608 days.

(21) Appl. No.: 11/179,248

(22) Filed: Jul. 12, 2005

(65) Prior Publication Data

US 2006/0026491 A1    Feb. 2, 2006

Related U.S. Application Data

(60) Provisional application No. 60/587,560, filed on Jul. 12, 2004.

(51) Int. Cl.
    *H04L 12/26* (2006.01)
(52) U.S. Cl. .................. 370/235; 370/252; 370/465
(58) Field of Classification Search ............ 370/232, 370/253, 545, 252, 465, 235, 333, 338; 375/225, 375/227
    See application file for complete search history.

(56) References Cited

U.S. PATENT DOCUMENTS

| | | | | |
|---|---|---|---|---|
| 5,896,561 | A * | 4/1999 | Schrader et al. | 455/67.11 |
| 6,081,843 | A * | 6/2000 | Kilkki et al. | 709/232 |
| 6,097,697 | A * | 8/2000 | Yao et al. | 370/230 |
| 6,141,565 | A * | 10/2000 | Feuerstein et al. | 455/560 |
| 6,546,509 | B2 * | 4/2003 | Starr | 714/704 |
| 6,704,368 | B1 * | 3/2004 | Nefedov | 375/265 |
| 6,751,199 | B1 * | 6/2004 | Sindhushayana et al. | 370/252 |
| 6,760,313 | B1 * | 7/2004 | Sindhushayana et al. | 370/252 |
| 2002/0122385 | A1 * | 9/2002 | Banerjee | 370/229 |
| 2002/0191722 | A1 * | 12/2002 | Naruse | 375/358 |
| 2003/0039318 | A1 * | 2/2003 | Tong et al. | 375/298 |
| 2003/0086378 | A1 * | 5/2003 | Chen et al. | 370/252 |
| 2003/0108045 | A1 * | 6/2003 | Jayam et al. | 370/394 |
| 2004/0001462 | A1 * | 1/2004 | Yavuz et al. | 370/333 |
| 2004/0017822 | A1 * | 1/2004 | Doan et al. | 370/465 |
| 2005/0013276 | A1 * | 1/2005 | Ekl et al. | 370/332 |
| 2005/0028066 | A1 * | 2/2005 | Raahemi | 714/758 |
| 2005/0058098 | A1 * | 3/2005 | Klein et al. | 370/329 |
| 2005/0083838 | A1 * | 4/2005 | Kandala | 370/230 |
| 2005/0213690 | A1 * | 9/2005 | Lauer et al. | 375/341 |

(Continued)

OTHER PUBLICATIONS

Viterbi, "Error Bounds for Convolutional Codes and an Asymptotically Optimum Decoding Algorithm", IEEE Transactions on Information Theory, vol. IT-13, No. 2, Apr. 1967, pp. 260-269.

(Continued)

*Primary Examiner*—Kwang B Yao
*Assistant Examiner*—Kenan Cehic
(74) *Attorney, Agent, or Firm*—Dang M. Vo (57) ABSTRACT

The present invention provides a method and system for controlling the data rate in packet based wireless communications. Then, using the probability of error, the invention calculates the throughput and drop probability for two or more data rates and selects the data rate with highest throughput. In one embodiment of the invention, the probability of error based on information passed back from the receiver regarding decoding errors. In another embodiment, the probability of error is based on acknowledgement packets returned by the receiver.

31 Claims, 5 Drawing Sheets

U.S. PATENT DOCUMENTS

2006/0029145 A1* 2/2006 Rajagopal et al. ........... 375/265
2006/0153232 A1* 7/2006 Shvodian .................... 370/468
2006/0264180 A1* 11/2006 Qiu ............................. 455/69
2007/0211786 A1* 9/2007 Shattil ........................ 375/141

OTHER PUBLICATIONS

IEEE 802.15.3, "Part 15.3: Wireless Medium Access Control (MAC) and Physical Layer (PHY) Specifications for High Rate Wireless Personal Area Networks (WPANs)," IEEE Computer Society, 2003.

* cited by examiner

RATE CONTROL FOR PACKET-BASED WIRELESS COMMUNICATION

CROSS-REFERENCE TO RELATED APPLICATIONS

This application claims the benefit of and priority to U.S. Provisional Patent Application No. 60/587,560 filed Jul. 12, 2004 the technical disclosures of which are hereby incorporated herein by reference.

TECHNICAL FIELD

The present invention is related generally to wireless communications and more specifically to method for adjusting the rate at which data packets are transmitted.

BACKGROUND OF THE INVENTION

A packet communication system, similar to other types of communication systems, provides for the communication of data between communication stations within a set of communication stations. The set includes at least a sending station and a receiving station. Data originated at, or otherwise provided to, a sending station is caused to be communicated by the sending station for delivery at a receiving station. The data from the sending station is sent through a communication channel, and the receiving station monitors the communication channel, thereby to detect delivery of the data communicated thereon.

In a packet communication system, data that is communicated is first packetized into packets of data, and the data packets, once formed, are then communicated, sometimes at discrete intervals. Once delivered to a receiving station, the information content of the data is ascertained by concatenating the information parts of the packets together. Packet communication systems generally make efficient use of communication channels as the communication channels need only to be allocated pursuant to a particular communication session only for the period during which the data packets are communicated. Packet communication channels are sometimes, therefore, shared communication channels that are shared by separate sets of communication stations between which separate communication services are concurrently effectuated.

Operating specifications that define the operating protocols of various types of packet radio communication systems have been promulgated and yet others are undergoing development and standardization. A packet radio communication system provides the advantages of a radio communication system in that the communication stations that are parties to a communication session need not be interconnected by electrically-conductive connectors. Instead, the communication channels of a packet radio communication system are formed of radio channels, defined upon a portion of the electromagnetic spectrum.

While packet radio communication systems have been developed for the effectuation of various different types of communication services, much recent interest has been directed towards the development of packet radio communication systems capable of providing data-intensive communication services. For instance, the IEEE 802.15.3a operating specification contemplates an Orthogonal Frequency Division Multiplexing (OFDM) Ultra Wide Band (UWB) communication system, capable of communicating data over wide bandwidths over short ranges.

Ultra Wideband (UWB) is defined as any radio technology having a spectrum that occupies a bandwidth greater than 20 percent of the center frequency, or a bandwidth of at least 500 MHz. Modern UWB systems use modulation techniques, such as Orthogonal Frequency Division Multiplexing (OFDM), to occupy these extremely wide bandwidths.

OFDM is a special case of frequency division multiplexed transmission that permits subcarriers to overlap in frequency without mutual interference, thereby increasing spectral efficiency. OFDM used for UWB transmission results in a novel physical layer system for the enablement of high bit rate, short-range communication networks.

The information transmitted on each band is modulated using OFDM, which distributes the data over a large number of carriers that are spaced at precise frequencies. This spacing provides the orthogonality in this technique, which prevents interference from adjacent tones. The benefits of OFDM include high-spectral efficiency, resiliency to radio frequency (RF) interference, and lower multipath distortion.

A structured data format is set forth in the present promulgation of the operating specification. The data format of a data packet formed in conformity with the IEEE 802.15.3a includes a preamble part and a payload part. Other packet communication systems analogously format data into packets that also include a preamble part and a payload part. The payload part of the packet contains the information that is to be communicated. That is to say, the payload part is nondeterminative. Conversely, the preamble part of the data packet does not contain the informational content that is to be communicated but, rather, includes determinative data that is used for other purposes. In particular, the preamble part of an IEEE 802.15.3a packet preamble includes three parts, a packet sync sequence, a frame sync sequence, and a channel estimation sequence. The packet sync sequence is of a length of twenty-one OFDM (symbols), the frame sync sequence is of a length of three OFDM symbols, and the channel estimation sequence is of a length of six OFDM symbols. Collectively, the sequences are of a time length of 9.375 microseconds.

The preamble portions are used, for instance, to facilitate synchronization between the sending and receiving stations that send and receive the data packet, respectively. Additionally, the preamble is used for purposes of automatic gain control (AGC). For use of automatic gain control, a receiving station is able to set its gain at an appropriate level, e.g., to facilitate application of received data to an analog-to-digital converter to supply useful bits to a baseband part of the receiving station.

The preamble is further used for purposes of packet detection. Packet detection identifies to the receiving station the reception at the receiving station of the packet. Upon detection of the packet, e.g., various state machines at the receiving station are started to enable processing of the incoming packet.

In packet-based wireless communications systems, the transmitting device must decide at what data rate to transmit each packet. It is generally the case that higher rates yield lower robustness and thus increase the probability that the packet will not be decodable at the receiver. However, it is desirable to transmit at higher data rates when possible. Thus, the transmitting device typically attempts to transmit at the highest data rate possible while still maintaining an acceptable probability of error at the receiver. The transmitter typically implements an algorithm that attempts to select the proper transmission rate that maximizes the throughput of the system. This algorithm is referred to as the rate control algorithm.

Present packet-based wireless systems, such as IEEE 802.11 or IEEE 802.15 systems, typically have a rate control algorithm that is run in an open loop (i.e. the transmitter has no feedback from the receiver as to which transmission rate is best). Additionally, the rate control algorithm itself is typically left outside the scope of the standard (i.e. left up to the implementer). In today's systems, rate control algorithms reduce the data rate when a packet error occurs. An error is typically identified by the absence of an acknowledgment (ACK) packet from the receiver. The rate is increased in a heuristic fashion (e.g., the system shifts to the next higher data rate after some period of time without significant errors).

Therefore, it would be desirable to have an improved method of controlling the data rate for packet-based communications.

SUMMARY OF THE INVENTION

The present invention provides a method and system for controlling the data rate in packet based wireless communications. Then, using the probability of error, the invention calculates the throughput and drop probability for two or more data rates and selects the data rate with highest throughput. In one embodiment of the invention, the probability of error is based on information passed back from the receiver regarding decoding errors. In another embodiment, the probability of error is based on acknowledgement packets returned by the receiver.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Convolutional encoding with Viterbi decoding is a Forward Error Correction (FEC) technique that is particularly suited to a channel in which the transmitted signal is corrupted mainly by additive white Gaussian noise (AWGN), which is noise with a voltage distribution over time that can be described using a Gaussian statistical distribution (i.e. a bell curve). This voltage distribution has zero mean and a standard deviation that is a function of the signal-to-noise ratio (SNR) of the received signal. Assuming that the signal level is fixed, if the SNR is high, the standard deviation of the noise is small, and vice-versa. For digital communications, the SNR is usually measured in terms of $E_b/N_0$, which stands for energy per bit divided by the one-sided noise density.

For example, a bipolar non-return-to-zero (NRZ) signaling a system has a '1' channel bit that is transmitted as a voltage of −1V, and a "0" channel bit transmitted as a voltage of +1V. This is also called binary "antipodal" signaling. A comparator in the receiver determines the received channel bit is a '1' if its voltage is less than 0V, and a '0' if its voltage is greater than or equal to 0V.

Mapping the one/zero output of the convolutional encoder onto an antipodal signaling scheme is a matter of translating zeroes to +1 s and ones to −1 s. This translation can be accomplished by performing the operation y=1-2x on each output symbol.

Viterbi decoding was developed by Andrew J. Viterbi. His seminal paper on the technique is "Error Bounds for Convolutional Codes and an Asymptotically Optimum Decoding Algorithm," *IEEE Transactions on Information Theory*, Volume IT-13, April 1967, pages 260-269, the contents of which are hereby incorporated by reference.

The decoding process begins by building the accumulated error metric for a specified number of received channel symbol pairs, and the history of what states preceded these states at each time instant t with the smallest accumulated error metric. The Viterbi decoder is then ready to recreate the sequence of bits that were input to the convolutional encoder when the message was encoded for transmission.

The accuracy of the decoding process is affected by the rate at which data is sent to the receiver. As the data rate increases so does the probability of error in the decoding process. However, this is not a fixed, linear relationship.

Current wireless communication systems sometimes toggle the data rate in ways that are often erroneously preemptive and delayed. The present invention provides enhanced data rate control, resulting in superior system performance by reducing delay and jitter and increasing system throughput and robustness. The present invention includes:

A new metric for making data rate shifting decisions

An enhanced open-loop rate control algorithm

A closed-loop rate control algorithm

Figure 1:
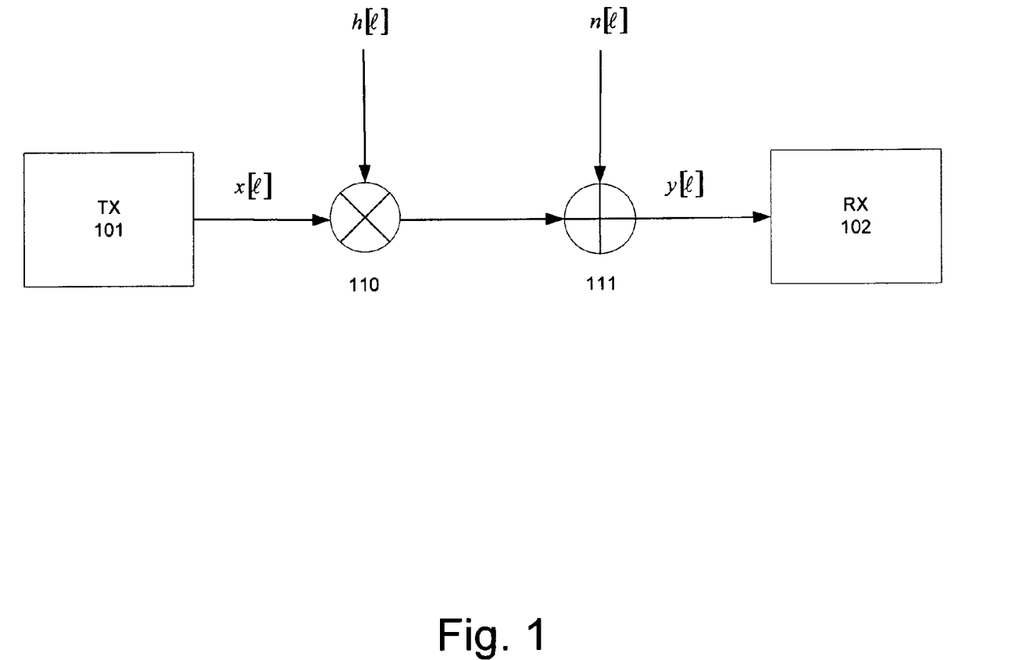
FIG. 1 is a block diagram of a wireless communication system.

A method of using the rate field of acknowledgement (ACK) packets for closed-loop feedback FIG. 1 is a block diagram of a wireless communication system. The system comprises a transmitter 101, receiver 102, multiplexor 110 and adder 111. In this example, x[l]ϵ C, where C is the set of all code words.

The multiplexor 110 combines several signals for transmission over a single channel h[l]. In frequency division multiplexing signals of different frequency each carry a different message. Orthogonal Frequency Division Multiplexing (OFDM) is a special case that permits subcarriers to overlap in frequency without mutual interference. The information is distributed over a large number of carriers that are spaced at precise frequencies that provides orthogonality, which prevents interference from adjacent tones.

After the channel h[l] has been multiplied, the adder 111 adds the noise n[l].

The data received by the receiver 102 is represented by y[l].

The Viterbi algorithm is typically thought of as an algorithm to select the message that was most likely to have been transmitted in a communications system. The Viterbi algorithm acts on a series of received symbols. In a typical implementation, the Viterbi algorithm sums the negative log of a sequence of probabilities. By selecting the message that has the lowest sum, the maximum likelihood message is selected.

In the present example illustrated in FIG. 1, yA finds:

$$\min_{x[l] \in C} \left[ -\log \prod_l Pr(y[l]|x[l]) \right]$$ Equation 1

Noting that the sum itself is the negative log of the product of probabilities, it can be seen that this value can also be associated with the probability that the packet will be decoded properly or not. Therefore, it is possible to establish a probability of a packet having been decoded properly, independently of whether or not it actually was decoded.

Figure 2:
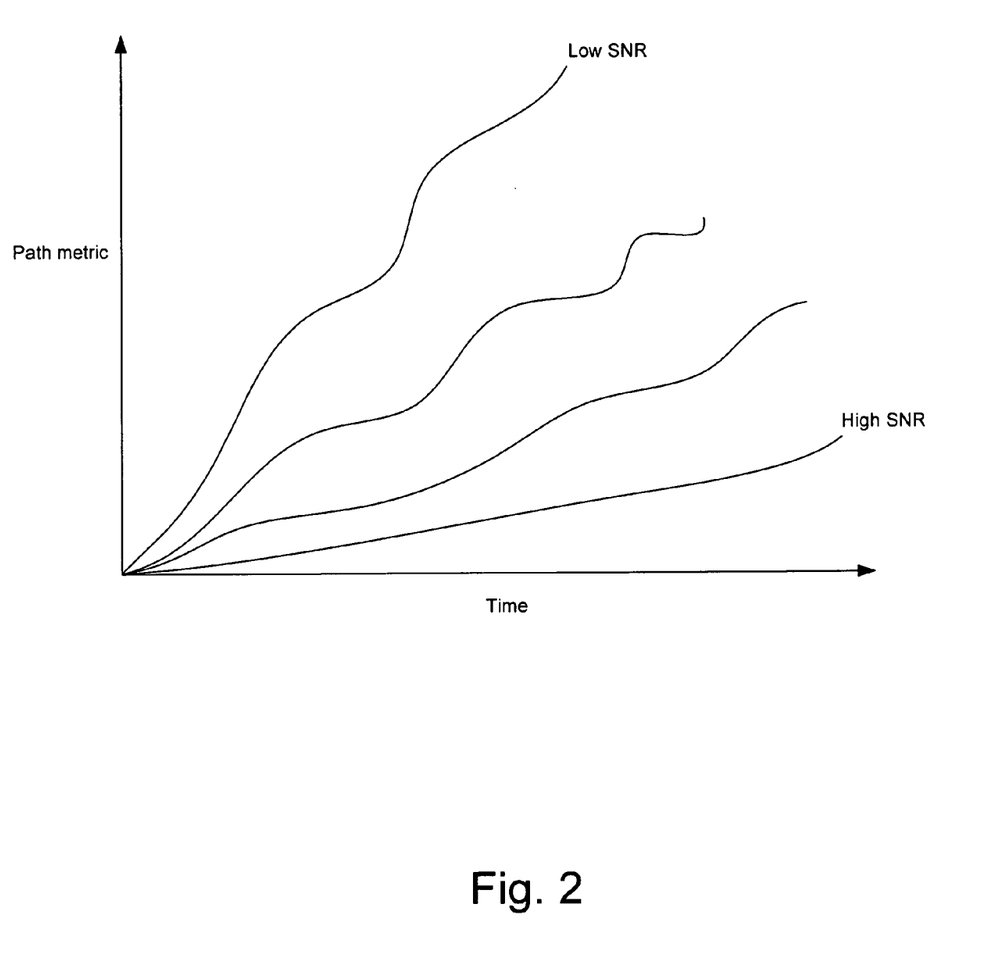
FIG. 2 shows the rate of growth of the path metric values of a signal.

FIG. 2 shows the rate of growth of the path metric values of a signal. The rate of growth of the path metrics can be shown to indicate the probability of a successful decode. The algorithm of the present invention uses the path metric values (i.e. Signal to Noise Ratio (SNR), packet error rate (PER)) and/or the path metric slope to predict the probability of properly decoding a packet. The growth of the path metrics is a function of the coding rate and the SNR at the receiver. If the SNR is very high, the Viterbi decoder path metrics grow very slowly since the probability of errors is very low. Thus, the path metric growth is related directly to the probability of error events at the receiver.

By using the algorithm to predict the possibility of successful packet decoding, the present invention provides enhanced open-loop rate control. Current rate control algorithms tend to operate heuristically based on decreasing the data rate when an error occurs, or increasing the rate when there are few or no errors. However, such algorithms do not maximize the throughput on a network.

Figure 3:
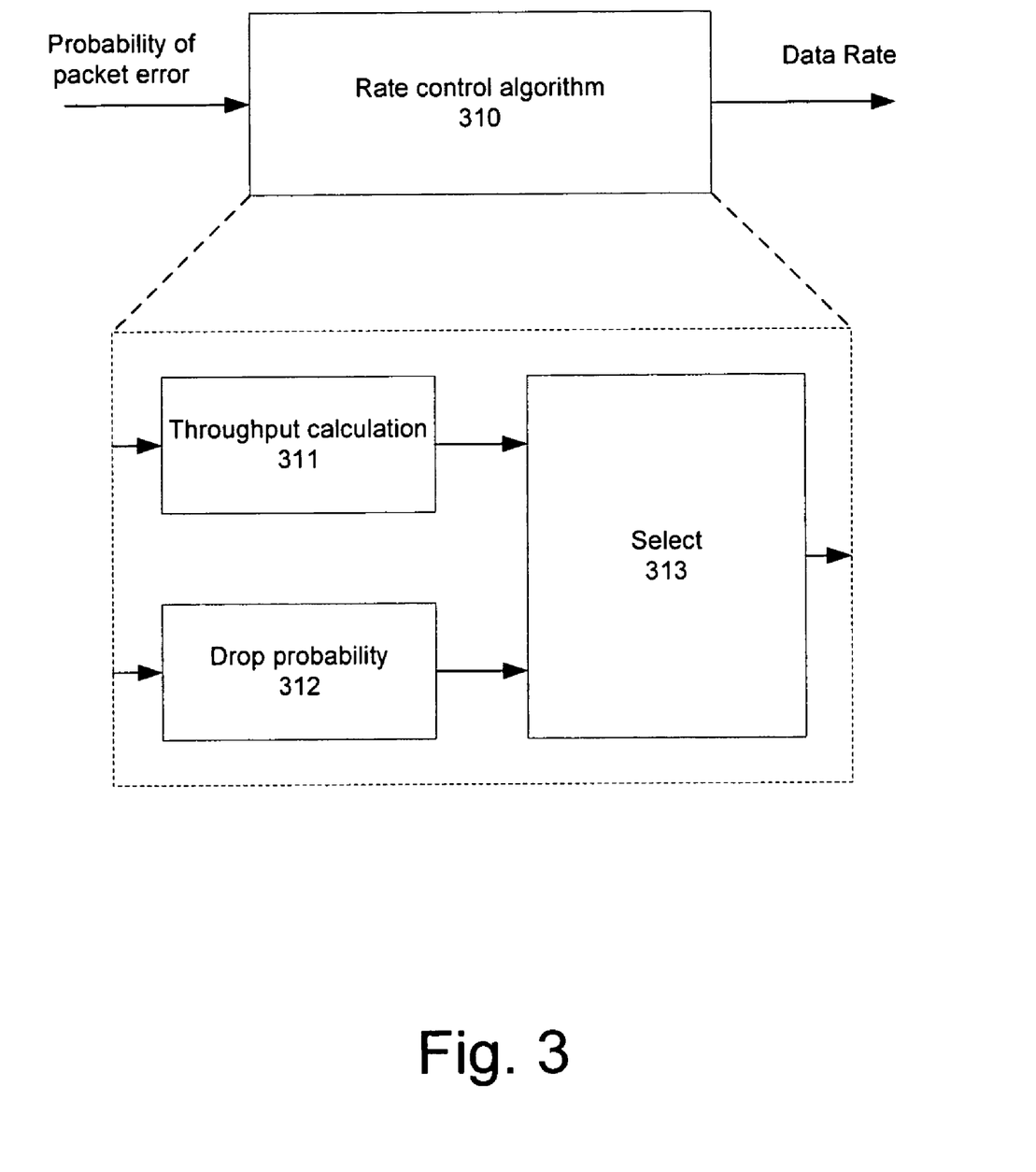
FIG. 3 illustrates the algorithm used to control transmission data rate.

FIG. 3 illustrates the algorithm used to control the transmission data rate. The maximum throughput packet error rate in wireless communications systems is frequently in the 1-8% range. These errors are effectively masked from higher layers by an Automatic Repeat reQuest (ARQ) mechanism in which the receiver requests retransmission if an error occurs. For example, in a system where the probability of packet error is 1%, the system would be left to operate at that data rate without adjustment by the rate control algorithm 310. This is typically true because the next higher data rate may have an error probability in excess of, e.g., 20%, which would not be tolerable, and the next lower data rate might have a very low error probability of, e.g., 0.1%, but with a lower overall throughput.

The rate control algorithm comprises two major components: a throughput calculation 311 and drop probability 312. The present invention uses these calculations to select the optimal transmit data rate based on an estimate of the packet error rate probability.

The example in Table 1 illustrates throughput calculations based on data rate and predicted error rate:

TABLE 1

| Data Rate (Mbps) | Error Rate | Throughput (Mbps) = Data rate × (1-Error rate) |
| --- | --- | --- |
| 480 | 0.2 | 384 |
| 400 | 0.01 | 390 |
| 320 | 0.001 | 319.68 |

Thus in the above example it can be seen that a data rate of 400 Mbps achieves a higher throughput than a data rate of 480 Mbps due to the lower error rate.

Drop probability is the probability that a packet will be dropped, expressed as a percentage. A drop probability of 0 means that a packet will never be dropped, and a value of 100 means that all packets will be dropped. In the present example, the drop probability with seven retries might be:

$D_{480\ Mbps} \cong 10^{-5} \Rightarrow$ Drop every second $\Rightarrow$ May be unacceptable $D_{400\ Mbps} \cong 10^{-14} \Rightarrow$ Drop every two millennia $D_{320\ Mbps} \cong 10^{-21} \Rightarrow$ Never The selection process 313 of the rate control algorithm 310 weighs both the throughput calculation and drop probability to determine the optimal data rate. The throughput is calculated based on the current statistics of the packets being received from the transmitter. The drop probability is predetermined based on pre-computed simulations and programmed as a look-up table. If the current throughput is less than the drop probability, the rate control algorithm tries to increase the rate. The optimization algorithm thus tries to balance the rate to get the best performance from the system.

Therefore, the rate control algorithm optimizes system performance based on the following criteria:
 maximized throughput;
 minimized delay;
 minimized "jitter"; or
 some combination thereof In wireless communications systems, the dominant error mechanism can be the noise in the system, e.g., additive white Gaussian noise (AWGN). Other error mechanisms include multi-path or excess delay spread. It is helpful to know which type of error is occurring to enable proper corrective actions to be taken.

In communication systems that employ receivers for multi-level coding, there are multiple decoders at the receiver. The decoder for the Most Significant Bits (MSBs) in a multi-level decoder has a 3-6 dB gain in performance over the Least Significant Bits (LSBs) decoder. Therefore, if the channel is AWGN, the MSBs do not need to be encoded, as they have an inherent performance advantage, which enables higher data rates in the system. However, the transmitter needs to know the type of channel in order decide whether to enable the higher data rate mode that avoids coding on the MSBs. Therefore, the knowledge of AWGN or multi-path limitations is useful in such a receiver.

In such a multi-level decoder, the receiver can tell whether the system is AWGN-limited or not by looking at the path metrics on the MSBs versus the LSBs. If the MSB path metrics show no growth, the channel is likely to be AWGN. This can be used to select the rates for the operational modes. The difference between the LSB path metrics and the MSB path metrics should relate to a 6 dB SNR gap in AWGN for multi-level coded systems. If the difference relates to a smaller number, the channel is likely to be fading and the smaller the difference, the stronger is the fading.

If the system is multi-path limited, the rates that turn off coding on the MSBs should not be used.

The rate selection algorithm examines both the packet length and data rate to determine how and when to change rates. It is possible that a large packet can be broken into smaller packets and transmitted at the same rate instead of lowering the rate when the ACKs are not obtained. This alternate approach provides better throughput than that obtained by lowering the rate.

The present invention also provides Open Look Rate Control Enhancements. In this mechanism, the system maintains a running estimate of the probable error rate for a given data rate. Periodically, transmissions are attempted at higher data rates and/or lower rates to obtain PER statistics at those rates. Based on the knowledge of error probabilities at the current rate, next higher rate, and next lower rate, the rate control algorithm decides whether to maintain the current data rate or change it upward or downward.

In addition to enhanced open-loop rate control, the present invention also provides enhanced closed-loop rate control.

Figure 4:
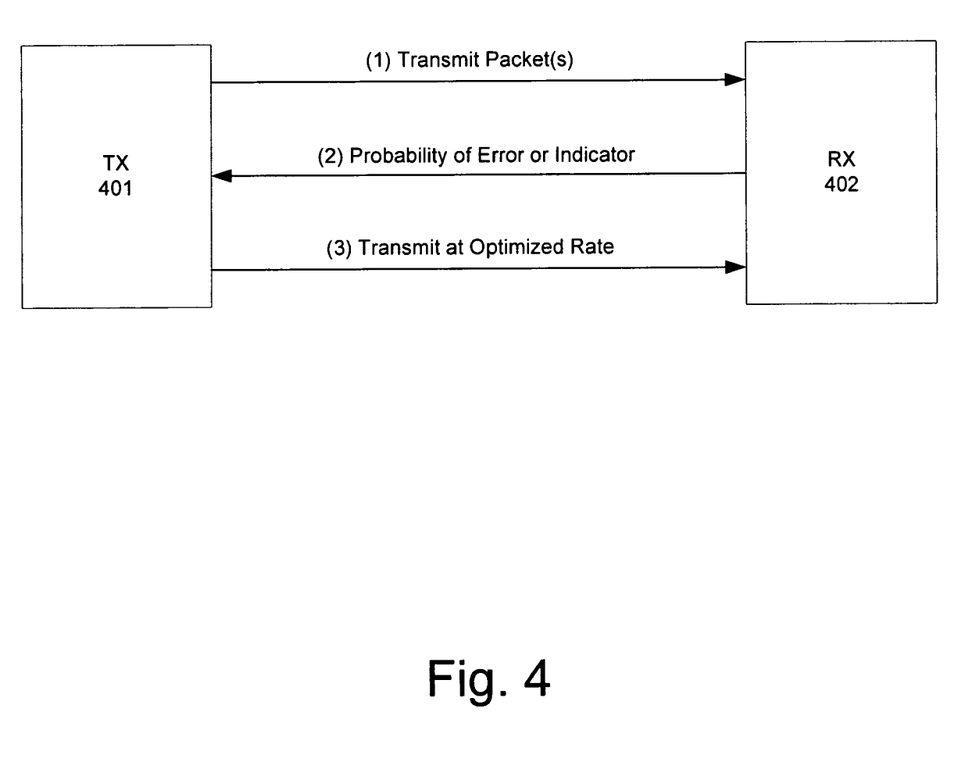
FIG. 4 shows a closed-loop rate control system in accordance with the present invention.

FIG. 4 shows a closed-loop rate control method in accordance with the present invention. The receiver 402 has the best knowledge of what the probability of error will be on an incoming packet. However, the rate control algorithm is located at the transmitter 401. To address this shortcoming, the present invention provides a system in which the receiver 402 passes information back to the rate control algorithm at the transmitter 401 to optimize the rate control decision.

The information passed back to the transmitter can be in various forms. In addition to the general case of passing information back to the transmitter, the present invention specifically includes:
1. Passing back the probability of error
2. Passing back the rate of Viterbi algorithm path metric growth
3. Passing back the minimum Viterbi algorithm path metric
4. Passing back a simple signal to increase, decrease or leave unchanged the data rate, including how many steps to increase or decrease the rate The feedback information from the receiver provides the rate control algorithm with a more accurate error probability, which in turn allows for more accurate throughput and drop probability calculations for selecting the optimal data rate.

Figure 5:
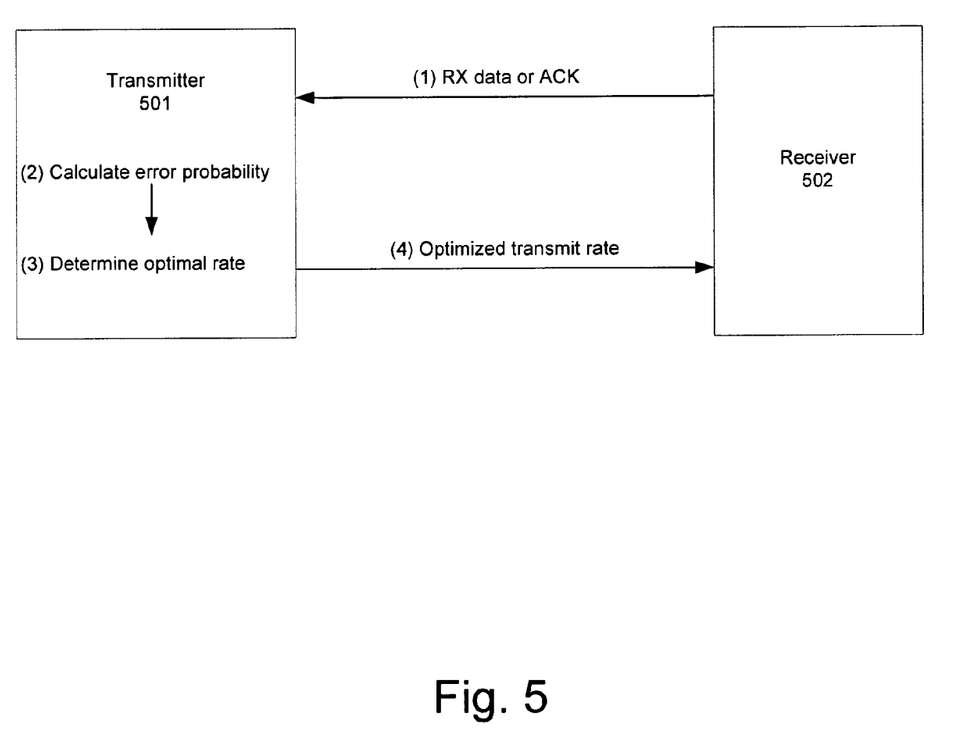
FIG. 5 shows a closed-loop rate control method based on the rate field in receiver ACK packets.

FIG. 5 shows a closed-loop rate control method based on the rate field in receiver ACK packets. The transmitter 501 is also a receiver for acknowledgement (ACK) packets and data packets from the receiver 502. The transmitter 501 has the ability to estimate the error rate on the incoming ACK and data packets. This error rate can then be used to estimate the error rate at the receiver 502. An algorithm uses the error probability on incoming packets from the receiver 502 to determine the correct data rate at which to transmit.

The rate field in the header of ACK packets does not convey any information, as there is no payload. As discussed above, the receiver can generate knowledge of the probability of success in decoding packets. The present invention uses these rate fields to feedback information to the transmitter as to what data rate the transmitter could transmit at next.

For example, if the packet was received at 100 Mbps, and the decoder determines that it could have been received at 300 Mbps with a similar error rate, the decoder can input the rate as 300 Mbps in the ACK packet, and the transmitter will use this information for rate selection. The advantage of this scheme is that it retains compatibility with existing systems and does not use any special unused fields in the packet that typically change with improvements in the standards.

In the case of packets which pass the header transmission but fail in the frame, generally, ACKs are not sent. However, the receiver can still send an ACK/control packet/NACK (Negative Acknowledgment) that informs the transmitter that the header passed but the payload did not, providing additional information for the transmitter to use for rate selection.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

We claim:

1. A method of selecting data rates for packet based wireless communication, the method comprising the steps of:
   (a) determining respective probabilities of packet decoding error for two or more data rates;
   (b) calculating respective throughputs for said two or more data rates based on their respective probabilities of decoding error;
   (c) calculating respective drop probabilities for said two or more data rates based on their respective probabilities of decoding error; and
   (d) selecting a data rate that maximizes throughput for a specified drop probability.

2. The method according to claim 1, wherein step (d) further comprises selecting a data rate that minimizes jitter.

3. The method according to claim 1, wherein step (d) further comprises selecting a data rate that minimizes delay.

4. The method according to claim 1, further comprising comparing Most Significant Bit (MSB) path metrics to Least Significant Bit (LSB) path metrics to determine if a dominant error mechanism for a communication channel is additive white Gaussian noise (AWGN), wherein if the MSB path metrics show no growth, the dominant error mechanism for the channel is AWGN.

5. The method according to claim 1, further comprising deactivating encoding for Most Significant Bits (MSB) if a dominant error mechanism for a communication channel is additive white Gaussian noise (AWGN).

6. The method according to claim 1, further comprising:
   if acknowledgements are not obtained from the receiver, dividing data packets of a specified size or larger into smaller data packets, wherein said smaller data packets are smaller than said specified size and can be transmitted without changing the current data rate.

7. The method according to claim 1, wherein the determination of error probabilities in part (a) is based on feedback information sent by a receiver.

8. The method according to claim 7, wherein the feedback information includes at least one of the following:
   probability of error;
   rate of Viterbi algorithm path metric growth;
   minimum Viterbi algorithm path metric; and
   a signal that instructs a transmitter whether to increase, decrease or leave unchanged the data rate, including how many steps to increase or decrease the data rate.

9. The method according to claim 1, wherein the determination of error probabilities in part (a) is based on acknowledgement packets sent by a receiver.

10. The method according to claim 1, wherein step (a) further comprises:
    periodically transmitting at data rates higher and lower than a current data rate to obtain probability of error statistics.

11. An apparatus for selecting data rates for packet based wireless communication, comprising:
    (a) means for determining respective probabilities of packet decoding error for two or more data rates;
    (b) means for calculating respective throughputs for said two or more data rates based on their respective probabilities of decoding error;

(c) means for calculating respective drop probabilities for said two or more data rates based on their respective probabilities of decoding error; and (d) means for selecting a data rate that maximizes throughput for a specified drop probability.

12. The apparatus according to claim 11, wherein component (d) further comprises means for selecting a data rate that minimizes jitter.

13. The apparatus according to claim 11, wherein component (d) further comprises means for selecting a data rate that minimizes delay.

14. The apparatus according to claim 11, further comprising means for comparing Most Significant Bit (MSB) path metrics to Least Significant Bit (LSB) path metrics to determine if a dominant error mechanism for a communication channel is additive white Gaussian noise (AWGN), wherein if the MSB path metrics show no growth, the dominant error mechanism for the channel is AWGN.

15. The apparatus according to claim 11, further comprising means for deactivating encoding for Most Significant Bits (MSB) if a dominant error mechanism for a communication channel is additive white Gaussian noise (AWGN).

16. The apparatus according to claim 11, further comprising:
if acknowledgements are not obtained from a receiver, means for dividing data packets of a specified size or larger into smaller data packets, wherein said smaller data packets are smaller than said specified size and can be transmitted without changing the current data rate.

17. The apparatus according to claim 11, wherein the determination of error probabilities by component (a) is based on feedback information sent by a receiver.

18. The apparatus according to claim 17, wherein the feedback information includes at least one of the following:
probability of error;
rate of Viterbi algorithm path metric growth;
minimum Viterbi algorithm path metric; and
a signal that instructs a transmitter whether to increase, decrease or leave unchanged the data rate, including how many steps to increase or decrease the data rate.

19. The apparatus according to claim 11, wherein the determination of error probabilities by component (a) is based on acknowledgement packets sent by a receiver.

20. The apparatus according to claim 11, wherein component (a) further comprises:
a means for periodically transmitting at data rates higher and lower than a current data rate to obtain probability of error statistics.

21. A computer readable medium encoded with computer executable instructions for selecting data rates for packet based wireless communication, the computer readable medium comprising:
(a) first instructions for determining respective probabilities of packet decoding error for two or more data rates;
(b) second instructions for calculating respective throughputs for said two or more data rates based on their respective probabilities of decoding error;
(c) third instructions for calculating respective drop probabilities for said two or more data rates based on their respective probabilities of decoding error; and
(d) fourth instructions for selecting a data rate that maximizes throughput for a specified drop probability.

22. The computer readable medium according to claim 21, wherein fourth instructions (d) further comprise instructions for selecting a data rate that minimizes jitter.

23. The computer readable medium according to claim 21, wherein fourth instructions (d) further comprise instructions for selecting a data rate that minimizes delay.

24. The computer readable medium according to claim 21, further comprising instructions for comparing Most Significant Bit (MSB) path metrics to Least Significant Bit (LSB) path metrics to determine if a dominant error mechanism for a communication channel is additive white Gaussian noise (AWGN), wherein if the MSB path metrics show no growth, the dominant error mechanism for the channel is AWGN.

25. The computer readable medium according to claim 21, further comprising instructions for deactivating encoding for Most Significant Bits (MSB) if a dominant error mechanism for a communication channel is additive white Gaussian noise (AWGN).

26. The computer readable medium according to claim 21, further comprising:
if acknowledgements are not obtained from the receiver, instructions for dividing data packets of a specified size or larger into smaller data packets, wherein said smaller data packets are smaller than said specified size and can be transmitted without changing the current data rate.

27. The computer readable medium according to claim 21, wherein the determination of error probabilities by first instructions (a) is based on feedback information sent by the receiver.

28. The computer readable medium according to claim 27, wherein the feedback information includes at least one of the following:
probability of error;
rate of Viterbi algorithm path metric growth;
minimum Viterbi algorithm path metric; and
a signal that instructs the transmitter whether to increase, decrease or leave unchanged the data rate, including how many steps to increase or decrease the data rate.

29. The computer readable medium according to claim 21, wherein the determination of error probabilities by first instructions (a) is based on acknowledgement packets sent by the receiver.

30. The computer readable medium according to claim 21, wherein first instructions (a) further comprise:
instructions for periodically transmitting at data rates higher and lower than a current data rate to obtain probability of error statistics.

31. An apparatus for selecting data rates for packet based wireless communication, comprising:
a processor configured to:
(a) determine respective probabilities of packet decoding error for two or more data rates;
(b) calculate respective throughputs for said two or more data rates based on their respective probabilities of decoding error;
(c) calculate respective drop probabilities for said two or more data rates based on their respective probabilities of decoding error; and
(d) select a data rate that maximizes throughput for a specified drop probability; and
a memory configured to store the selected data rate.

* * * * *

UNITED STATES PATENT AND TRADEMARK OFFICE
CERTIFICATE OF CORRECTION

PATENT NO. : 7,593,339 B2 Page 1 of 1
APPLICATION NO. : 11/179248
DATED : September 22, 2009
INVENTOR(S) : Shoemake et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this

Twenty-first Day of September, 2010

David J. Kappos
*Director of the United States Patent and Trademark Office*